June 14, 1949.　　　J. J. WALLACE　　　2,473,315
COTTON HARVESTER
Filed Oct. 14, 1947　　　3 Sheets-Sheet 1
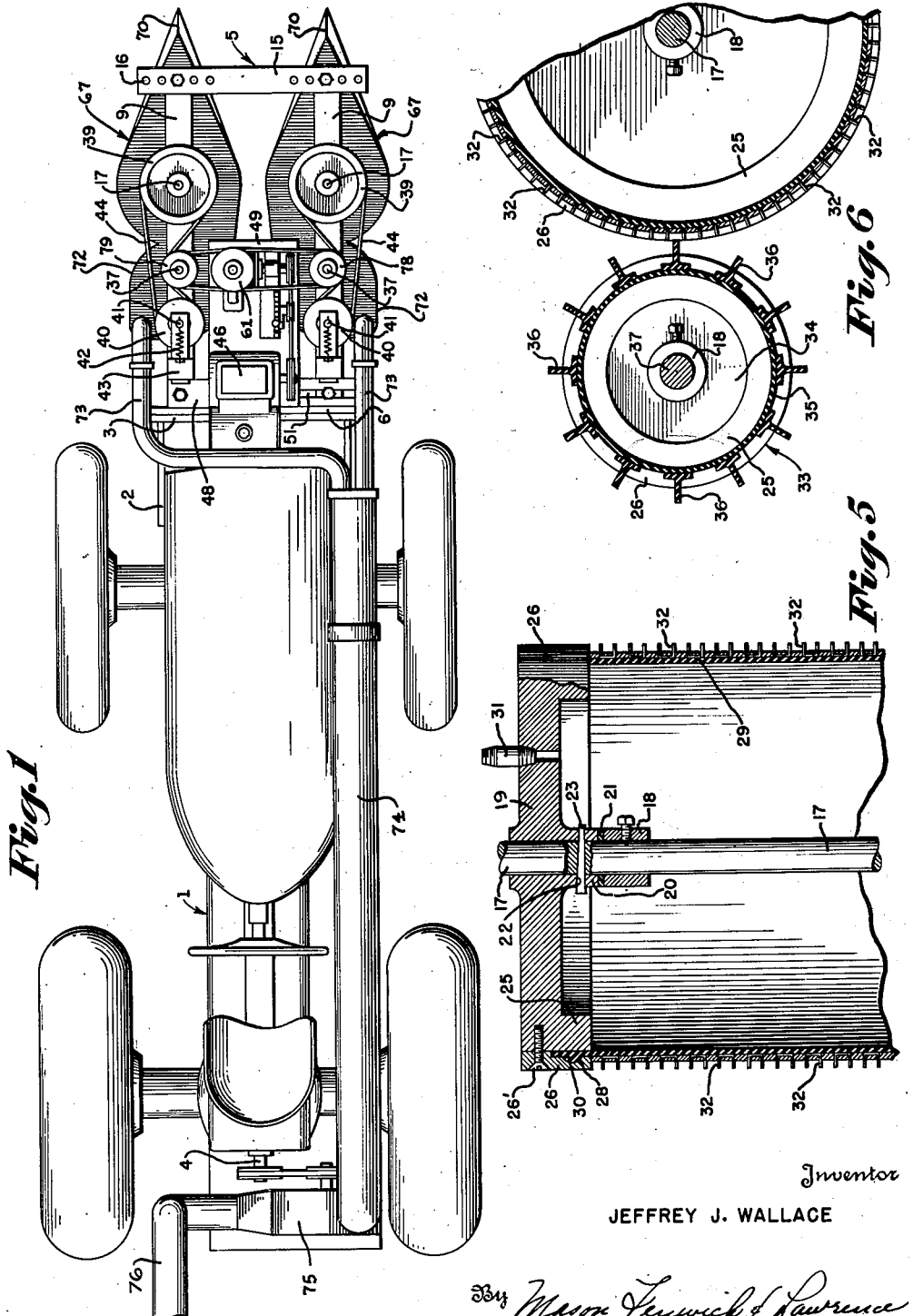
Inventor
JEFFREY J. WALLACE

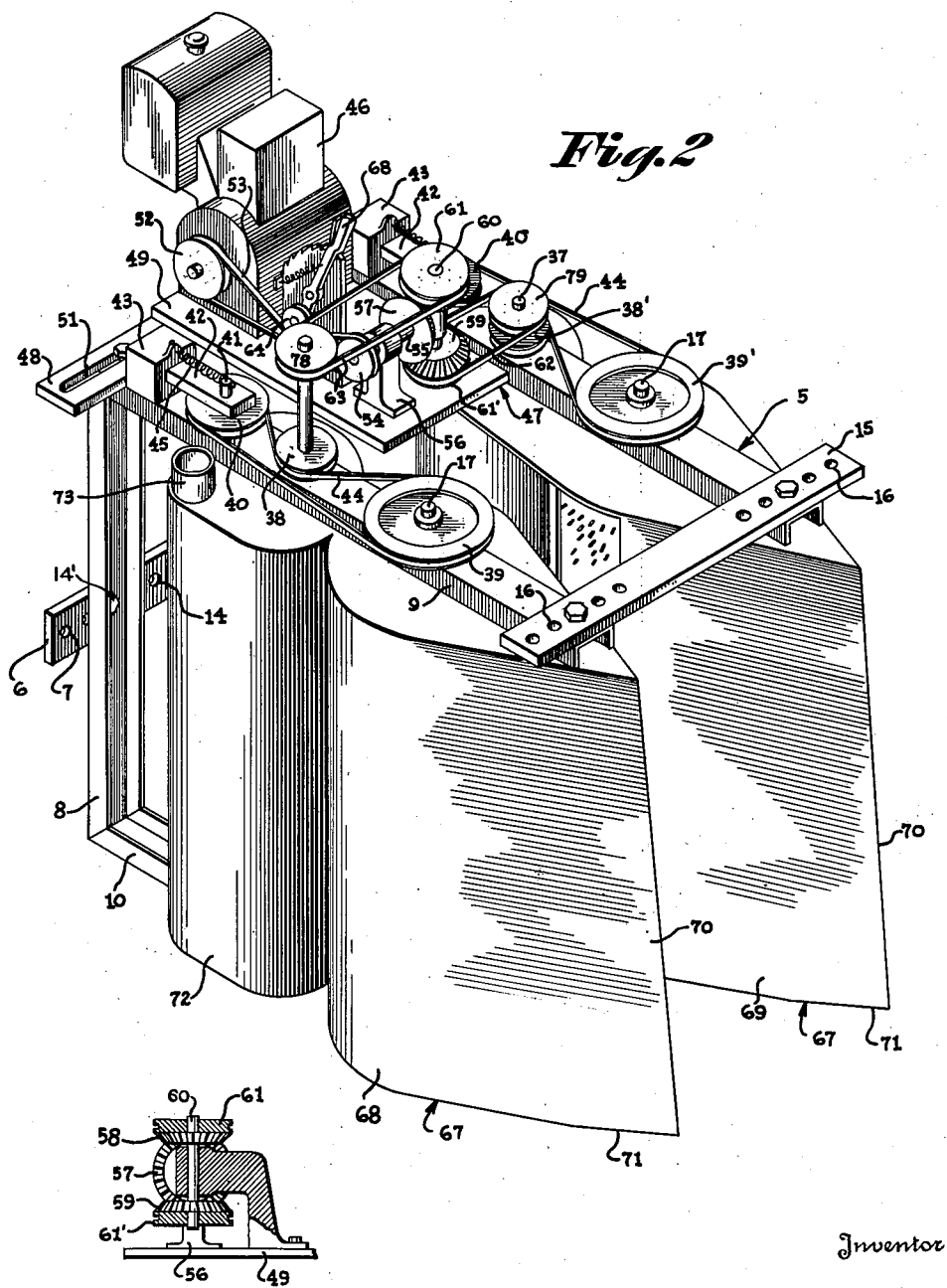

June 14, 1949.  J. J. WALLACE  2,473,315
COTTON HARVESTER
Filed Oct. 14, 1947  3 Sheets-Sheet 3
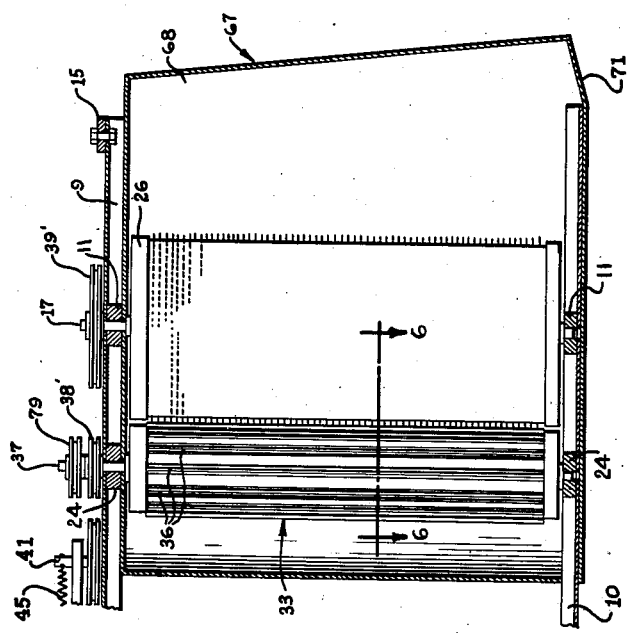
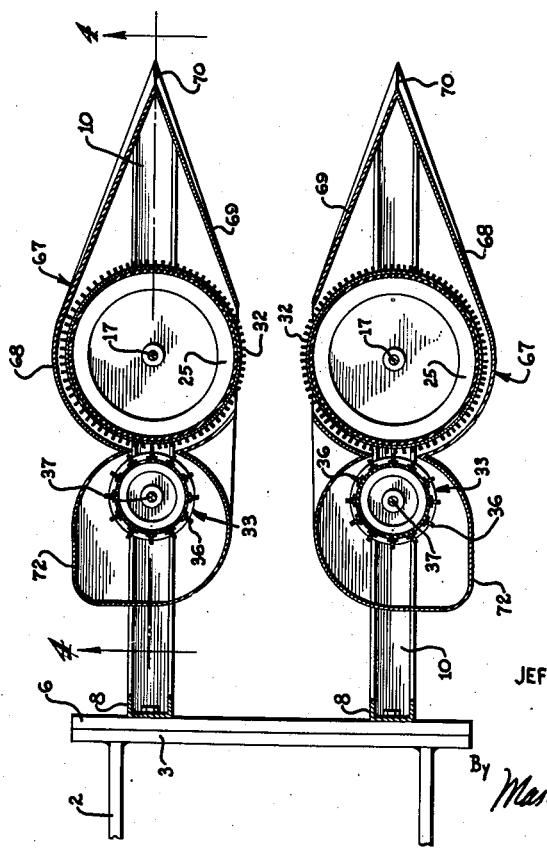
Inventor
JEFFREY J. WALLACE Patented June 14, 1949

2,473,315

UNITED STATES PATENT OFFICE 2,473,315

COTTON HARVESTER

Jeffrey John Wallace, Amite, La., assignor to Gullett Gin Company, a corporation of Louisiana Application October 14, 1947, Serial No. 779,797

3 Claims. (Cl. 56—48)

This invention relates to a cotton harvester for gathering seed cotton, of the type which moves along the row, compressing the standing plants between picking cylinders studded with pins, which draw the cotton from the bolls and which revolve past doffing means by which the cotton is removed from the cylinders.

The chief objection to cotton harvesters of this type as at present known, is that the picking cylinders are substantially rigid, compressing the plant unyieldingly so that stems, leaves and bolls are crushed between the cylinders or torn off from the plant, which mix with the cotton, making it excessively trashy and consequently difficult to subsequently clean.

The principal object of the present invention is to provide a seed cotton harvester of the general type above described, the picking cylinder walls being of flexible material such as sheet rubber or the like, distended by inflation, the degree of inflation being controllable to obtain the desired flexibility of the cylinder walls to suit conditions of dryness and maturity of the plant, so that when parts of the plants, such as immature bolls, stems, etc., pass between the cylinders, they are not crushed or disintegrated, but create localized depressions in the cylinder walls complementary to their bulk and pass through intact and without detachment from the plant. Thus contamination of the cotton is minimized.

Another object of the invention is to provide a cotton harvester as described, in which the doffing cylinders which contact the picking cylinders are also formed with flexible inflatable side walls. This is desirable because under different inflation pressures of the picking cylinder walls they may be bulged to a variable extent, and it is essential that the doffing cylinders be capable of assuming a complementary shape so as to make proper end-to-end contact with the picking cylinders.

A further object of the invention resides in the specific construction of the picking and doffing cylinders.

Still another object of the invention is to provide a seed cotton harvester of the type described, including a vacuum collector, serving the doffing cylinders, adapted to be mounted with relation to a conventional tractor.

Another object of the invention is to provide motive power for the picking cylinders, having a variable speed range whereby the peripheral speed of the picking cylinders moving in a direction opposite to that of the tractor may be adjusted equal to the speed of the tractor so that the standing cotton plant is not subjected to any dragging force tending to pull it over and drag off parts of the plant.

Other objects of the invention will appear as the following description of a preferred and practical embodiment thereof proceeds.

In the drawings throughout the several figures of which the same reference characters have been employed to designate identical parts:

Figure 1 is a plan view of a cotton harvester embodying the principles of the invention;

Figure 2 is a perspective view of the harvester detached from the tractor and suction conduits;

Figure 3 is a horizontal cross-section through the harvester in a plane intermediate its top and bottom;

Figure 4 is a vertical longitudinal section taken along the line 4—4 of Figure 3, through the cylinder supports and casings, the cylinders being shown in elevation;

Figure 5 is an axial section through one of the picking cylinders;

Figure 6 is a horizontal fragmentary cross-section through a pair of cooperating picking and doffing cylinders, taken along the line 6—6 of Figure 4;

Figure 7 is a detail view in vertical section of a portion of the reverse drive between the right and lefthand cylinder units.

Referring now in detail to the drawings, a tractor 1 is shown, having a tractor frame 2, which includes a cross front frame member 3, this construction being conventional with tractors. This cross frame member is particularly mentioned, since it affords a means to which the cotton harvester is adjustably secured. At the opposite end, the tractor has the power take-off 4.

The harvester frame, which as a whole is designated by the reference character 5, may be of any desired detailed construction, but is here shown as comprising a horizontal mounting bar 6, adapted to be bolted to the cross frame member 3, bolt holes 7 being provided for this purpose. On the front of the mounting bar a pair of similar forwardly directed C-shaped cylinder supports 8 are vertically mounted in lateral spaced relation. The upper and lower members 9 and 10 of the cylinder supports have the vertically aligned bearings 11 for the shafts of the picking cylinders, and rearwardly of these, the vertically aligned bearings 24 for the shafts of the doffing cylinders. The cylinder supports 8 are relatively adjustable widthwise on the mounting bar 6, the latter having at each side a longitudinal series of holes 14 selectively engageable by a bolt 14' carried by the corresponding support 8. Only one side of the mounting bar 6 is shown, but both sides are alike. The upper members 9 of the cylinder supports are bridged near their outer ends by the auxiliary cross bar 15, having series of holes 16 overlying said upper members which may be selectively brought into registry with an underlying hole in each of said upper members, providing passages for bolts to fix said cylinder supports in parallel relation. The space between the lower members 10 of the cylinder supports is unobstructed from end to end, forming a plant alley.

The picking cylinders, of which there are two, laterally disposed at the front of the frame 5 and slightly spaced apart, each comprises a shaft 17 having a collar 18 near each end. A circular head 19 is slipped upon each end of the shaft outside of the collar, having a hub 20 which rests against the collar 18, a rubber washer 21 intervening. The hubs 20 and the parts of the shaft which they surround are provided with tapered holes 22, the parts of the holes which extend through the shaft being slightly out of alignment with the part through the hubs when the latter are resting lightly against the washers 21. A tapered pin 23 is driven through each of the holes 22, which forces the head compressively against the washer 21, forming an air seal and at the same time fixing the heads nonrotatively with respect to the shaft. The lower head rests upon one of the bearings 11, supported on the lower member 10 of the cylinder support.

The heads 19 each have a peripheral inwardly extending flange 25, the outer circumferential face of which extends parallel to the axis of the shaft 17. A split resilient clamping ring 26 fits about the head, cooperating with the flange 25. Said ring has screws 26' at opposite sides of the split which engage the flange 25 and draw the clamping ring tightly toward said flange. On its inner face the ring 26 is formed with a circumferential shallow channel 27, having a vertical circumferential wall, and with a circumferential groove 28 indenting said vertical wall intermediate its width.

A tubular sleeve 29 of rubber or the like is provided, having characteristics of flexibility and stretchability similar to those of the inner tube of an automobile tire. Said sleeve has repose diameter of such size as to enable its ends to be slipped over the flanges of the respective heads 19.

Close to each end, the sleeve 29 has a circumferential molded external bead 30. In assembling, the tubular sleeve having been slipped upon the flanged heads 19, the split rings 26 are opened so as to pass over said heads until the end portions of the sleeve 29 are within the channels 27 with the beads 30 within the grooves 28. The rings are then clamped tightly against the heads, compressing the beaded ends of the sleeve to form an airtight joint between the sleeve and heads. The upper head is provided with a conventional air check valve 31, through which the sleeve 29 may be inflated.

The sleeve 29 has vulcanized or cemented thereto a surrounding sheet of card clothing made of rubber or like material having the qualities of stretchability and flexibility of the sleeve, and studded on its outer surface with integrally molded or extruded projections of pins 32. In normal use, the sleeve will be inflated until it bulges slightly beyond true cylindrical contour.

When a pair of the picking cylinders, as described, are mounted in operative proximity, the resiliency of the cylinder walls provides a means by which the immature bolls and fibrous limbs of the cotton plant can pass through the same without being crushed or disintegrated, the surface of the cylinders conforming to the obstructions, permitting the same to pass through. At the same time, in this process of the cylinder walls conforming to the shape of the bulk of the plant portions passing between them, a broader area of the card clothing is presented to the cotton plant and into contact with the seed cotton. The degree of inflation may be modified to obtain optimum performance in this regard.

Behind each picking cylinder is a doffing cylinder 33. These are of smaller diameter than the picking cylinder but of generally similar construction, having heads 34 similar to the heads 19 of the picking cylinders and inflatable sleeves 35 similar to the sleeves 29. The means for providing airtight joints may be the same, and the top heads 34 of the doffing cylinders have inflating valves 31. The doffing cylinders are mounted on shafts 37.

The sleeves 35 of the doffing cylinders have longitudinally extending rubber-like strips 36 cemented or vulcanized thereon, extending from end to end and projecting radially. Said strips contact the picking cylinders and wipe the seed cotton from the pins 32. For proper performance, the strips 36 should make contact from end to end with the picking cylinders, and since the contour of the picking cylinders is modified according to the degree of their inflation, the sides of the doffing cylinders are made flexible and inflatable so that they may be adjusted to conform to the shape of the picking cylinders by modifying the degree of their inflation.

At their upper ends, the shafts 37 and 17, respectively, of the doffing and picking cylinders are provided with the respective pulleys 38 and 38', and 39 and 39', in a common horizontal plane with a take-up idler pulley 40, the latter being journaled on a stub shaft 41 mounted on a base 42 slidable in a guide block 43 fixed on the upper member 9 of the cylinder support. A belt 44 passes around each set of three pulleys, on the outside of pulleys 38 and 38', and the inside of pulleys 39 and 39', to reverse the direction of rotation of the picking cylinders with respect to that of the doffing cylinders. A spring 45 urges the pulley 40 in a belt tightening direction. The shafts 37 each has a driving pulley 78 and 79, respectively, fixed thereto above the respective pulleys 38 and 38', for driving the doffing cylinders and which in turn drive the picking cylinders.

The doffing and picking cylinders are powered by a small internal combustion engine 46, mounted upon an engine support, designated as a whole by the reference character 47, comprising a cross bar 48 and a platform 49 rigid therewith and extending forwardly therefrom. The cross bar 48 is bolted to the top of one of the upper members 9 of the cylinder supports through a circular bolt hole, and to the top of the other upper member 9 through a slot 51, thus allowing for lateral adjustment of the cylinder supports. By this construction the engine is always at a fixed distance with respect to one of the driving pulleys.

The extended end of the engine shaft carries a pulley 52, which is connected by a belt 53 with a pulley 54, the latter being at the end of a stub shaft 55, transversely journaled in a standard 56, mounted on the platform 49. The opposite end of the stub shaft carries a bevel gear 57, which meshes with upper and lower horizontal gears 58 and 59 independently journaled upon a vertical shaft 60, fixedly mounted with respect to the platform 49. The gears 58 and 59, respectively, carry the horizontal pulleys 61 and 61'. The latter is connected by the belt 62 to the doffing cylinder driving cylinder pulley 79, which is at a fixed distance from the engine. The pulley 61 is connected by the belt 63 to the driving pulley 78 of the other doffing cylinder which is at a variable distance from the engine on account of the adjustment provided by the slot 51 at the adjacent end of the cross bar 48. It is obvious that the belt 63 must be replaced by one of different length, according to the direction of the lateral adjustment of the cylinder support.

The arrangement of bevel gears 57, 58 and 59 produce reverse revolution of the belts 62 and 63, so that the doffing cylinders rotate in opposite directions, imparting opposite rotation to the picking cylinders but in reverse directions to the doffing cylinders, the direction of rotation of the engine shaft being such that the adjacent sides of the picking cylinders rotate contra to the forward direction of movement of the tractor.

Means for varying the speed of rotation of the picking and doffing cylinders, without throttling the engine, are provided by having the belt 53 loose enough to slip when unconstricted and by providing a belt tightener consisting of a roller 64 at the end of a pivoted bell crank lever, spring urged against the belt, and which may be let off to any desired extent by operating the lever 68, which as shown, is the other end of the bell crank.

The picking cylinders are each partially enclosed by a casing 67 of sheet material which extends the full depth of the cylinder, comprising an outer wall 68, which extends to a point directly forward of the cylinder, where it is joined by an inner wall 69, the two walls forming a dihedral angle the apex 70 of which slopes forwardly and downwardly. The inner walls 69 of both casings are mutually convergent in a rearward direction, forming a funnel for embracing the standing cotton plant and guiding it compressively into the working space between the picking cylinders. The adjacent sides of the picking cylinders are exposed, to the rear of the inner walls 69. The casings 67 are preferably closed at the top and bottom, the bottom walls 71 sloping slightly upwardly at the front, forming skids which prevent the casings catching on ground obstructions.

The doffing cylinders are surrounded, excepting at the front, by casings 72 closed at top and bottom, forming suction chambers for collecting the cotton from the doffing cylinders.

The suction chambers are connected by means of the branch conduits 73 to a suction pipe 74, which extends lengthwise of the tractor and above it, and which communicates with the induction end of a centrifugal blower 75. The seed cotton is discharged from the blower through a discharge pipe 76, which may empty into a wagon or other receptacle. The blower 75 is mounted at the rear of the tractor and running from the power take-off 4, as shown.

While I have in the above description disclosed what I believe to be a preferred and practical embodiment of my invention, it will be understood by those skilled in the art that the specific details of construction and arrangement of parts, as shown and described, is by way of illustration and not to be construed as limiting the invention.

What I claim as my invention is:

1. Cotton harvester including a pair of driven picking cylinders rotatable toward one another, mounted on vertical axes and in lateral adjacency, adapted to compact the cotton plant between them as the harvester travels along a row of plants, said cylinders each having a flexible side wall and being inflatable to maintain said side wall under yielding pressure, whereby the side walls yield complementary to the shape of protuberant portions of the plant coming between said cylinders, permitting them to pass therebetween without being torn from the plant.

2. Cotton harvester including a pair of driven picking cylinders rotatable toward one another, mounted on vertical axes and in lateral adjacency, adapted to compact the cotton plant between them as the harvester travels along a row of plants, said cylinders each having a flexible side wall and being inflatable to maintain said side wall under yielding pressure, whereby the side walls yield complementary to the shape of protuberant portions of the plant coming between said cylinders, permitting them to pass therebetween without being torn from the plant, said side walls being studded with pins for combing lint from the bolls.

3. Cotton harvester as claimed in claim 2, including also a pair of doffing cylinders behind said picking cylinders and in operative contact therewith, said doffing cylinders having flexible side walls and being inflatable to maintain their side walls under yielding pressure whereby said side walls yield complementary to the shape of the side walls of said picking cylinders, maintaining longitudinal contact between the respective doffing and picking cylinders.

JEFFREY JOHN WALLACE.

REFERENCES CITED

The following references are of record in the file of this patent:

UNITED STATES PATENTS

| Number | Name | Date |
|---|---|---|
| 476,764 | Hall | June 7, 1892 |
| 1,600,877 | Hardin | Sept. 21, 1926 |
| 1,650,796 | Kellogg | Nov. 29, 1927 |
| 1,731,825 | Morava | Oct. 15, 1929 |
| 1,895,160 | Green | Jan. 24, 1933 |
| 1,901,686 | Wirth | Mar. 14, 1933 |
| Re. 20,633 | Benjamin | Jan. 25, 1938 |